W. G. Phillips.
Automatic Gate.
No. 324.
Reissued Aug. 21. 1855.
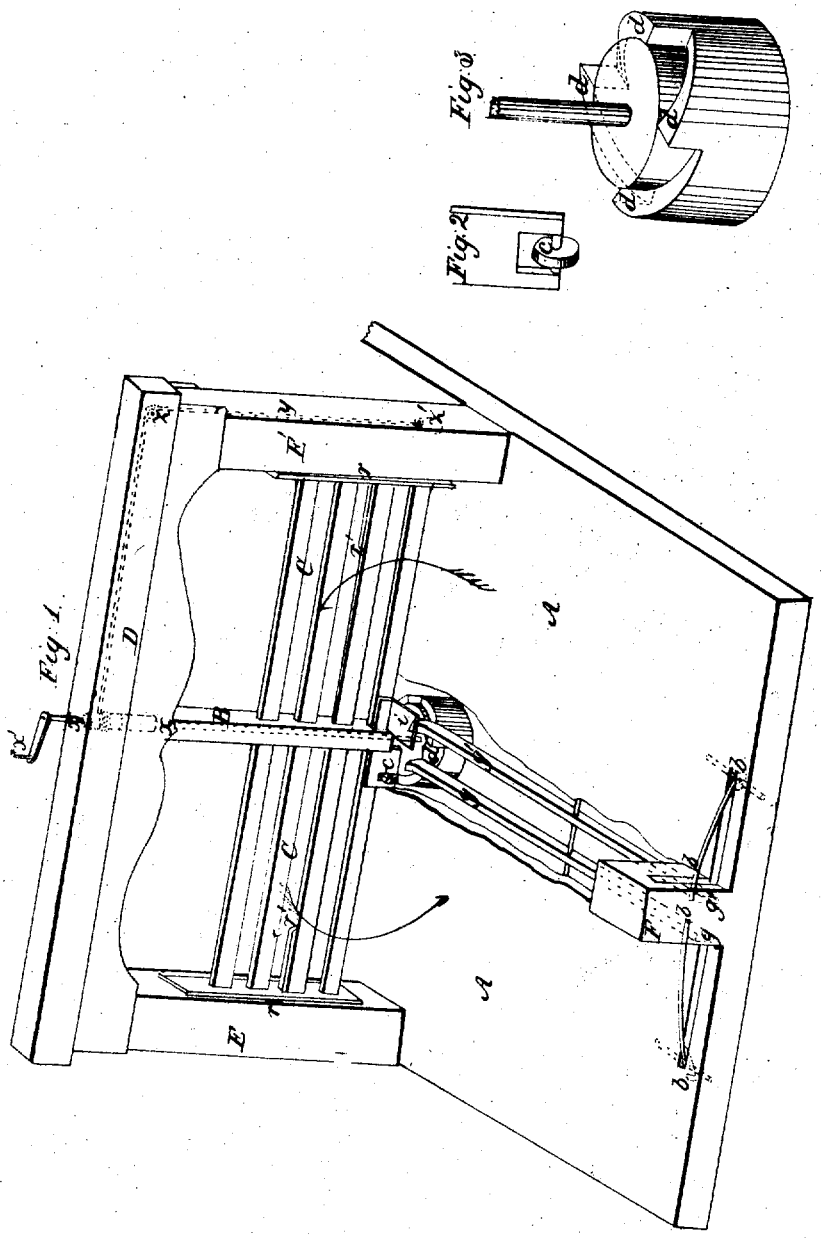

UNITED STATES PATENT OFFICE.

WILLIAM G. PHILIPS, OF NEWPORT, DELAWARE.

METHOD OF OPENING AND CLOSING GATES.

Specification forming part of Letters Patent No. 10,593, dated March 7, 1854; Reissue No. 324, dated August 21, 1855.

*To all whom it may concern:*

Be it known that I, WILLIAM G. PHILIPS, of Newport, in the county of New Castle and State of Delaware, have invented certain new and useful Improvements in the Method of Opening and Closing Gates; and I do hereby declare the following to be a full, clear, and exact description of the same, reference being had to the accompanying drawings, making a part thereof, in which—

Figure 1 represents an isometrical view of a gate with the several parts connected therewith, by which it is caused to open and close. Figs. 2 and 3 represent detached portions of the same on an enlarged scale.

The nature of my invention relates to a method of hanging and operating a double-span rotating gate, so that by simply releasing its catches it will rotate intermittently in the same direction to open or close, as the case may be.

To enable others skilled in the art to make and use my invention, I will proceed to describe the same with reference to the drawings.

A represents a platform, upon which the gate and its several supporting and operative parts may be arranged.

B is a gate-post, on each side of which is a gate, C, so as to make said post common to two ways or passages. The gate-post B has suitable journals at each of its ends, upon which it may rotate when the gates are released from their catches, as will be described hereinafter.

E E′ are two posts, set, one at each outside of the two passages, so that the bolt, spring, or other device upon the gates will catch upon a suitable projecting piece on the said posts, which are set upon the same, or nearly the same, line with the center rotating post, B. A horizontal piece, D, forms an upper tie and support for the tops of the three posts B E E′, which stand at right angles with the ways or passages.

Underneath the gate-post B are arranged a series of inclined planes, *d*, upon which friction-rolls *c* are caused to run (said rolls *c* being attached to the bottom of the post) when the gate is let down onto said inclined planes. The planes *d* are each in extent about one-fourth of a circle, and when the rolls *c* are started at the top of these planes they will run down and around a fourth of a circle and the gates with them. The gates, as they come to the posts E E′, or F, as the case may be, are caught and held by the spring-catch *r′* on the gates taking into the catches *r* on the posts E E′, or those F, (there being two posts, F though but one seen in the drawings,) as the gates may be required to be open or closed. The posts F are parallel with the line of the ways or passages, and midway or central between them, so that when the gates are caught against F the ways or passages are open, and when against E E′ they are closed. The catches are arranged one higher than the other on the posts, so that the spring-catches on the gates may readily take into them, and when the gate is to be released to make another quarter-turn it must be raised over the catch, or the catch lowered from it to release it. The cam-planes *d* are thrown under the rolls *c* when the gate is raised up by means of a reacting-spring or its equivalent.

Another way of rotating the gate is by means of a cord or chain, *y*, one end of which is wound round the axis of the post B, and thence passing over a pulley, *z*, terminates in a falling weight, *z′*. In this case, whenever the gates are released from their catches, the weight *z′* causes the gates to rotate until again caught, as before described. This plan, however, involves the necessity of winding up the weight every time it reaches the ground, which may be done by the winch *x′*, it having ratchet-teeth upon its socket, which take into similar teeth on the axis of B, and thus acts like a watch-key—viz., to be rigid in one direction and slip over in the other, and thus avoid the necessity of turning the gates in winding up the cords.

In the line of the ways or passages between the posts, and at such suitable distance therefrom as will effect the object in time, are placed on each side of said posts springs or yielding pieces *b*, over which the carriage-wheels shall pass. These pieces *b* pass over the tops of two levers, *g g′*, which act alternately in raising the gate to release it from its fastenings by lifting against pieces *i*, attached to the gate.

If, as represented in Fig. 1, the lever *g′* were pressed down by a carriage-wheel in passing over its piece *b*, the gate would swing open, the carriage passing through would meet on the other side a piece similar to *b* and *g*, which would press down *b*, raise the gate from its catches, and allow it to swing shut, it being understood that there are duplicates of *b b* and *g g'* on each side of the gate. Any contrivance which will release the gate from its catches will allow it to swing around a quarter revolution, but always in the same direction, as seen by the arrows in red.

Having thus fully described the nature of my invention and shown how the same may be used in practice, what I claim therein as new, and desire to secure by Letters Pater is—

A double-span rotating gate, opening a closing by an intermittent rotating motion one direction only, said motion being deriv through lifting pieces or levers, cam-plan weights or cords, or their equivalent, subst tially as herein set forth.

WM. G. PHILIPS

Witnesses:
A. B. STOUGHTON,
THOMAS H. UPPERMAN.